Dec. 29, 1936.  E. C. WILSON  2,066,086
FLUSHOMETER
Filed Aug. 5, 1933   3 Sheets-Sheet 2
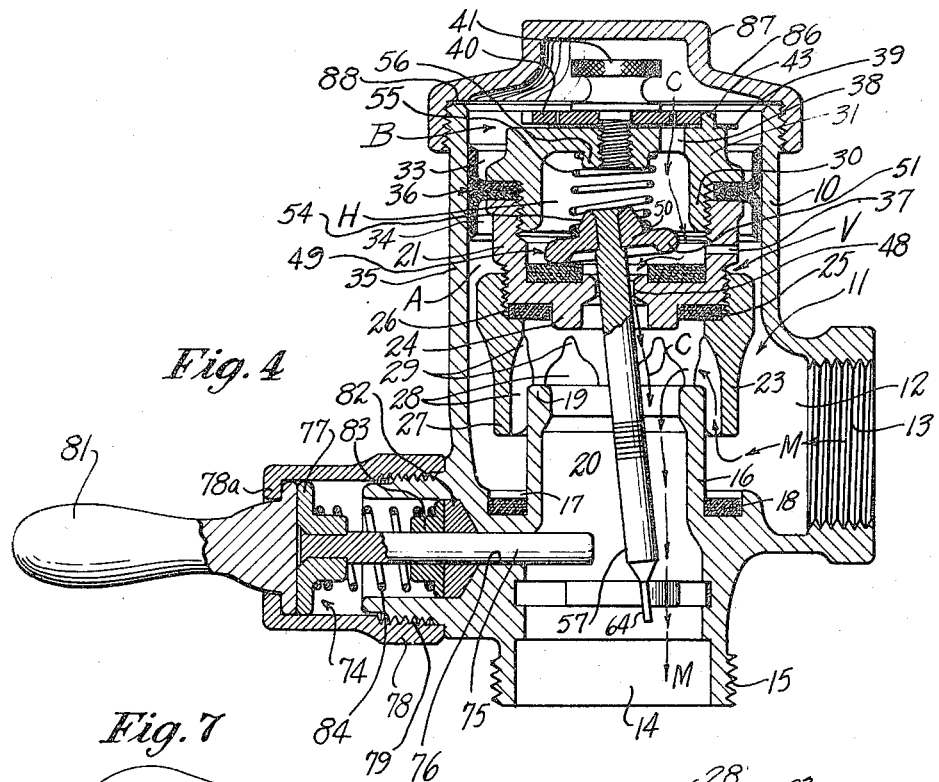
Fig. 4
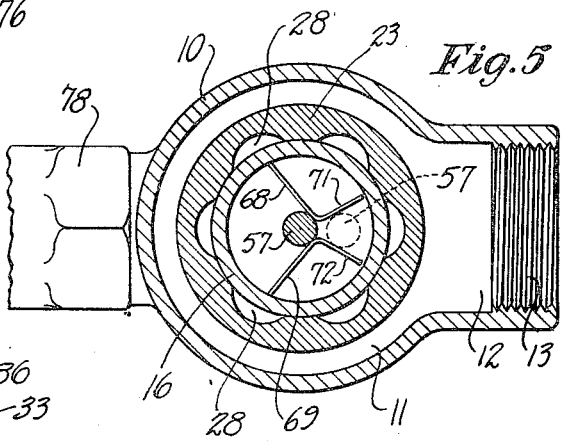
Fig. 5
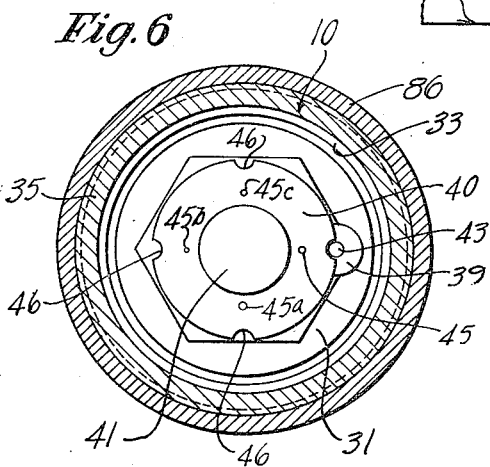
Fig. 7
Fig. 6
Inventor
Elihu C. Wilson.
Attorney.

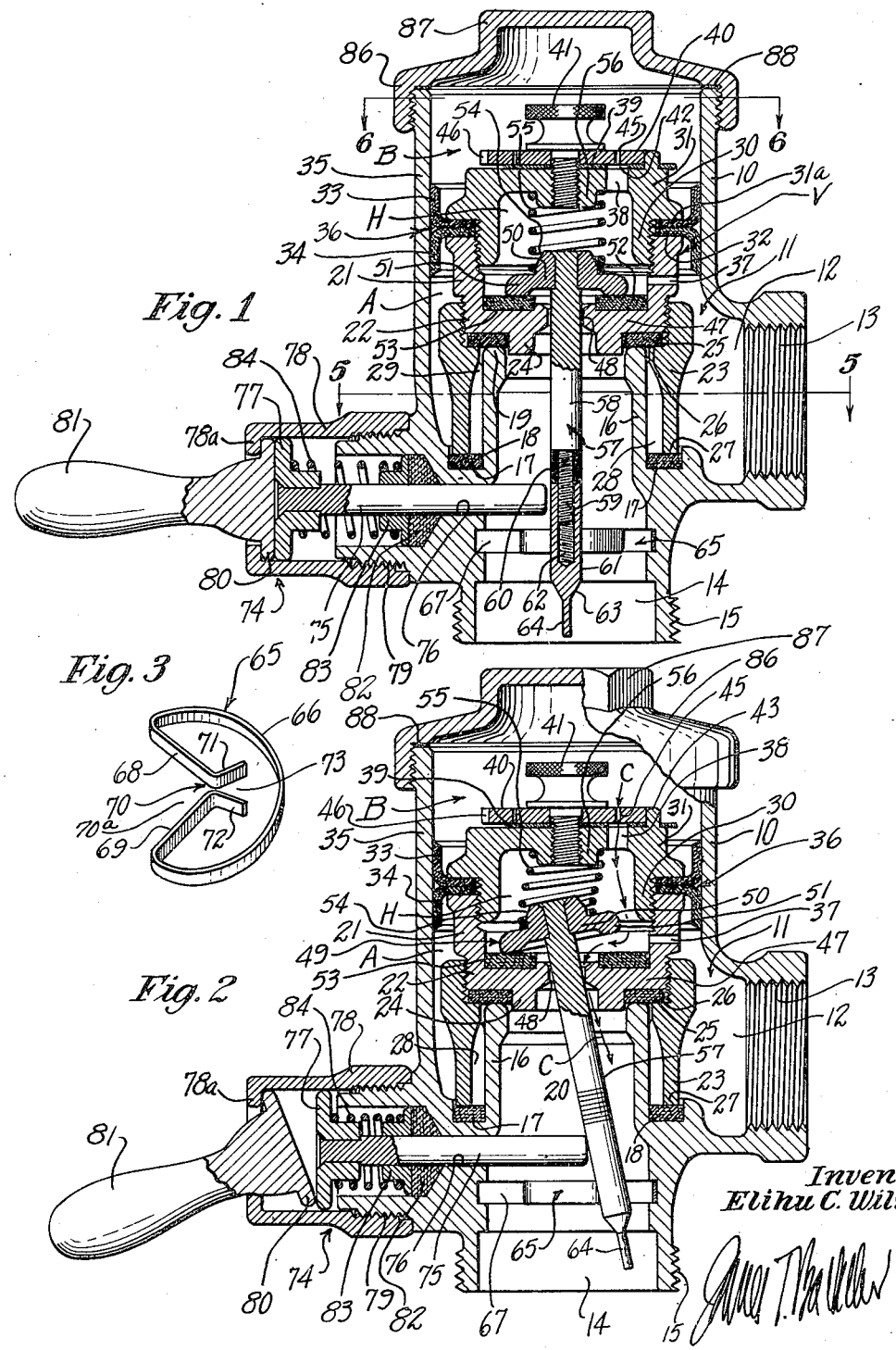

Dec. 29, 1936.   E. C. WILSON   2,066,086
FLUSHOMETER
Filed Aug. 5, 1933   3 Sheets-Sheet 3
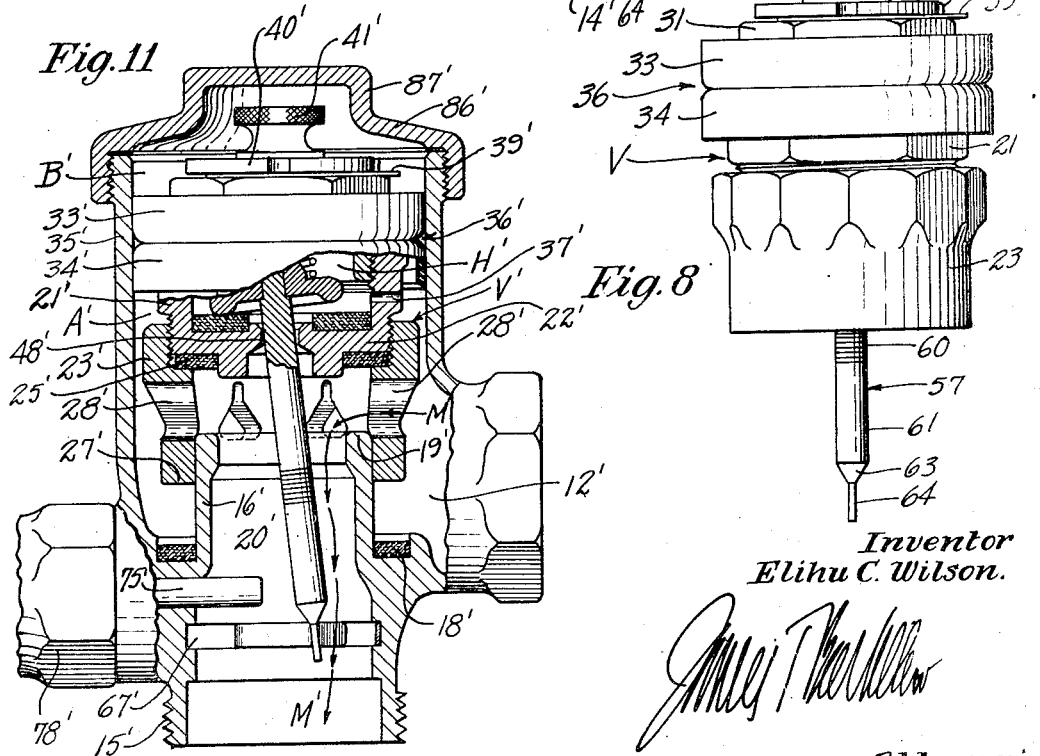
Inventor
Elihu C. Wilson.
Attorney.

Patented Dec. 29, 1936

2,066,086

UNITED STATES PATENT OFFICE 2,066,086

FLUSHOMETER

Elihu C. Wilson, Los Angeles, Calif.

Application August 5, 1933, Serial No. 683,807

13 Claims. (Cl. 137—93)

This invention relates generally to flush valves or flushometers used in flushing systems for toilet bowls and the like, and is more particularly concerned with valves of the type whereby the flushing fluid is delivered to the bowl directly from the supply line, as distinguished from float-controlled valves used in connection with delivery from flush-tanks.

The general objects of the invention include the provision of a valve whereby there are had exceedingly quiet deliveries of flushing fluid in predetermined, uniform quantities irrespective of variable water pressures or duration of time the actuating handle is depressed; a valve of great strength and durability, with its number of parts reduced to a minimum (partially by way of giving individual parts several functions) yet accurate in and readily accessible for fine adjustments; and a valve in which the danger of by-pass-stoppage is reduced to a minimum. It is a most important feature of my valve that once the actuating handle is depressed, even though it be only for an instant, a full, complete cycle of operation necessarily ensues, to obvious advantage.

As is true of all valves of the type to which this invention is directed, my valve requires an initial manual operation, whereupon it continues to deliver flushing water until there is a delayed, automatic shut-off of flow.

In order better to point out my advance, I will briefly describe certain prior art devices and some of their shortcomings. This is not done in the spirit of derogation, but merely to lay a foundation upon which to base distinguishing characteristics of my invention.

Such prior art devices include a body member having a main fluid passageway adapted to be traversed by a main valve carried by a piston reciprocally mounted in a cylinder, fluid from the passageway being admitted under pressure to the cylinder, and the stopper normally closing off the passageway.

There is provided a relief valve for the cylinder chamber at one side of the piston, and, when it is desired to open the main valve, the relief valve is first manually opened, this resulting in a lowering of pressure at said one side of the piston, the consequently predominant pressure at the other side of the piston moving said piston in a direction to open the main valve. However, the pressure-relief and consequent opening movement of the main valve continues only so long as the relief valve is manually held open, which frequently is only an instant. It follows that the main valve must open very quickly and the closing thereof must be considerably delayed in order to insure an ample flushing discharge. The delay is accomplished, after the relief valve is closed by the operator's release of the actuating handle, by the provision of a very small by-pass orifice which slowly admits line-pressure to the partially exhausted cylinder chamber, the pressure thus slowly building up to cause a delayed return of the main valve to closed position.

This type of control leads to several serious faults. In the first place, the operator may or may not hold the relief valve open long enough to insure a full opening of the main valve, thus leading to non-uniform and consequent inefficient flushing discharge. Often the flushing discharge is insufficient due to a premature release of the actuating handle, calling for a second flushing operation with consequent waste. On the other hand, an operator, after realizing the consequences of premature release, often holds the relief valve open an inordinately long time to insure ample flushing, and thereby causes considerable waste of water each time he operates the valve.

An attempt to reduce the evils of the above situation has been made by arranging for a sudden and, as nearly as possible, full-opening of the main valve the instant the relief valve is opened. This sudden opening of the main valve produces a violent rush of water, under full pressure, through the valve, driving the air in the discharge pipe through the small perforations in the toilet fixture and causing very objectionable hissing noises. Furthermore, the rapid rush of water produces a partial vacuum, giving rise to gulping noises.

Since, with these suddenly opened valves, the adequacy of the flushing discharge depends on a slow closing of the valve, it follows that the by-pass orifice controlling the closing movement must be very small, with a consequent great liability of stoppage by foreign matter. Such stoppage, in any degree, throws the valve mechanism out of time, and if at all aggravated, renders the valve entirely inoperative. Furthermore, the closing of the valve is slowed down to such an extent that disagreeable "throttling" noises result.

I overcome the above objectionable features primarily by utilizing a novel control principle. Instead of depending upon a sudden opening and greatly delayed closing of the main valve in order to insure adequate flushing discharge, I have devised means whereby the main valve opens relatively slowly, regardless of the length of time the operator manipulates the relief valve, assuring an adequate, uniform and quiet flushing-discharge. This is accomplished in the illustrated embodiment of my invention by means of a retainer which, once the operator has opened the relief valve, releasably holds that valve open until the main valve has reached a predetermined position (normally full-open). The relief valve is then automatically freed from the retaining means and returns to closed position, whereupon the main valve closes by reason of the restoration of line pressure in the previously relieved cylinder chamber, such restoration being by way of the by-pass orifice.

Since the period of main valve operation is in no way dependent upon the length of time the operator depresses the actuating handle of the relief valve, the main valve may be timed to give the most efficient results. For instance, its opening movement may extend over a relatively long period, giving an initially slow and gradually increasing flushing volume which eliminates the noises incident to sudden valve-opening. With this opportunity to discharge a relatively large volume of flushing water during the opening movement of the valve, it is possible to speed up the closing movement thereof and thus eliminate the "throttling" noises incident to excessively slow closing.

And it will be seen that the volume of water discharged will always be in predetermined amount, the timing of the main valve being independent of the operation of the actuating means, except for initiation. Certain adjustments whereby this timing may be altered will be spoken of later.

Since the closing of the main valve may be relatively fast, the by-pass orifice controlling this movement may be relatively large, with a consequent diminishment of clogging liability. As an added feature I have utilized this by-pass as a part of the control passageway through which the pressure is relieved from the cylinder chamber, yet I have so arranged the various elements that this relatively large orifice is not effective to allow relief of pressure (controlling the opening movement of the valve) in the same degree as it allows the rebuilding of pressure (controlling the closing movement of the main valve.) This is done by setting up a back-pressure or baffling action during the opening movement of the main valve, whereby the relief of pressure from the cylinder chamber is partially offset or resisted by incoming line pressure, thus reducing the speed of the opening movement of the main valve. Thus, the single by-pass orifice plays its part in both the opening and closing phases of main-valve movement, but has differential effectiveness during the two phases. It has the advantage of giving a large orifice as far as its non-clogging and fast-fluid-passing characteristics are concerned during the closing movement of the main valve, and yet it becomes effective only as a smaller orifice (without the clogging propensities thereof) when its office is to act as a retardant to valve-opening movement.

Additionally, during each cycle of operation, fluid flows alternately in opposite directions through the by-pass orifice, flushing the orifice in a manner to maintain it clear of foreign matter. This feature is distinguished from the by-pass arrangement in usual valves wherein the fluid flows through the by-pass in one direction only, tending to lodge more securely and pile up any foreign matter which may find its way to the orifice.

Other objects and features of the invention will be made apparent in the following detailed description in which;

Fig. 1 is a longitudinal, medial section through an embodiment of my invention, showing the main and relief valves closed;

Fig. 2 is a view similar to Fig. 1 except that the relief valve has been moved to open position;

Fig. 3 is a perspective view of a retainer used in connection with the relief valve;

Fig. 4 is a view similar to Fig. 2 except that the main valve has been moved to open position;

Fig. 5 is a section on line 5—5 of Fig. 1;

Fig. 6 is a section on line 6—6 of Fig. 1;

Fig. 7 is a perspective view of a gasket used in connection with the by-pass orifice;

Fig. 8 is a detached, side elevation of the main valve and piston assembly;

Fig. 9 is a detached view of a variational form of valve sleeve;

Fig. 10 is a view generally similar to Fig. 1, except that it is partially in elevation and shows the valve sleeve of Fig. 9 substituted for the valve sleeve shown in Fig. 1; and Fig. 11 is a view similar to Fig. 10 but showing the main valve in open position.

In the following description of the illustrated embodiment of my invention, I will make reference to particular structural characteristics and particular locations of passageways, orifices, valves, etc., but it is to be understood that such references are not to be considered as limitative on the broader aspects of the invention. For instance, one broad aspect of the invention has to do with the novel association of the control passageway, relief valve, relief valve retainer, by-pass orifice, and an orifice leading from the main fluid passageway to the cylinder chamber at one side of the piston, and certain of my broader claims are drawn to this association without specifying certain particularities of the illustrated relationship of these elements. However, I have illustrated an embodiment of the invention wherein these certain particularities are in themselves novel and give particularly efficient results. Hence they are made the subject-matter of individual claims but are not to be considered as controlling the broader claims to the general association. For instance, I have shown the control passage, the relief valve, and the several orifices all incorporated in the main valve and piston assembly and movable bodily therewith, and claims have been drawn to this particular feature, though it is not essential to the operativeness of the general association as expressed in the broader claims.

The numeral 10 designates a tubular body member, usually of cast brass, to the bore 11 of which opens laterally extending inlet 12 arranged for threaded attachment at 13 to a supply line (not shown). The downwardly opening outlet of the valve is indicated at 14, being provided at 15 for threaded connection with the flushing line of the toilet fixture (not shown).

Concentric with bore 11 and outlet 14 is an upstanding annular flange or discharge pipe 16 which is spaced annularly from the outer wall of the body member. Inserted within a groove 17 at the base of flange 16 is a replaceable seating ring 18 of rubber or the like, while the upper end 19 of the flange provides a sealing face, as will later be made apparent.

I will designate the main fluid passage through the valve by letter M (see Fig. 4) this passageway extending from inlet 12 and through the bore 20 of flange 16 to outlet 14.

The valve assembly V, which includes a piston-actuated main-valve stopper, is movable vertically through bore 11 of the body member to and from a position closing off flange-bore 20 and hence passageway M. While this valve is shown as having a double seat, giving decided advantages which will later be pointed out, it will be understood this characteristic is not essential to the operation of the valve and is not to be considered as limitative on the broader aspects of the invention.

Assembly V includes a body portion 21 of cup-shaped configuration, the lower portion 22 being of reduced outside diameter and externally threaded to take the depending, valve-stopper sleeve 23 of the main valve, said sleeve having sliding fit over flange 16, leaving the bore of said flange unobstructed. Flange 16 thus forms a centering guide for maintaining assembly V in proper position during reciprocation thereof.

Body portion 21 has a depending annular flange 24 about which is fitted a replaceable seating ring 25, of rubber or the like, said ring being clamped between the under face of portion 22 and the upwardly facing annular shoulder 26 on sleeve 23. This seat ring is adapted to engage flange end 19 in fluid-tight relation when the main valve is closed as in Fig. 1, and since the ring is radially confined between flange 24 and sleeve 23, it is held from radial spreading even though it be engaged with flange 16 repeatedly and under heavy pressure, to obvious advantage. The lower end 27 of sleeve 23 is adapted to engage seat ring 18 to effect a fluid-tight closure at that point simultaneously with the effecting of a seal at 19—25, the sealing burden thus being divided between two areas and greatly prolonging the useful lives of each. It will also be seen that packing ring 18 is radially confined between the defining walls of groove 17, to prevent radial spreading of said packing in a manner similar to that described in connection with packing 25. The double seat has a further advantage which will be discussed at a later point in the description.

Vertically extending passageways or channels 28 are sunk in the inner face of sleeve 23 (see Figs. 4 and 5) these passageways gradually diminishing in cross-sectional area or effective opening at their upper ends 29.

Body portion 21 is internally threaded to take the depending flange 30 of head 31, the laterally extending annuli 31a and 32 of piston leathers 33 and 34, respectively, being clamped between body portion 21 and head 31. Piston leathers 33 and 34 are cup-shaped with their flanges disposed oppositely and in engagement with the walls of cylinder 35 which makes up a portion of body member 10. The cylinder chamber above the piston, which will be generally designated as 36, is indicated at B, while the cylinder chamber below piston 36 is indicated at A, it being noted that piston leathers 33 and 34 face toward the compartments B and A respectively, so fluid under pressure within those chambers tends to maintain the leathers in fluid-tight engagement with the cylinder walls.

Body portions 21 and head 31 define the piston-hollow or chamber H which may be considered as intermediate chambers A and B. An orifice 37 in body portion 21 maintains compartment H in constant communication with main fluid passageway M at the inlet side of main valve sleeve 23, it being noted that the assembly above sleeve 23 forms a barrier against the direct flow of fluid from inlet 12 to the bore of flange 16 when the parts are in the position of Fig. 1. The main-valve stopper may thus be considered as of inverted cup-shape, the sleeve 23 forming the skirt thereof.

A passageway 38 extends through head 31 from chamber H, while on top this head is a gasket 39 and an orifice disk 40, the gasket and disk being centered and clamped to head 31 by clamping screw 41. An opening 42 through gasket 39 is maintained in registration with passageway 38 by a pin or lug 43 extending upwardly from head 31 and through the gasket at 44. Orifice disk 40 has a plurality of orifices 45, 45a, 45b, and 45c of graduated diameters, which orifices are adapted to be brought selectively into registration with passageway 38. In radial alinement with each disc orifice is a notch or recess 46 adapted to take registering lug 43. The wall defining each notch may be considered a stop-shoulder. Thus, by unscrewing clamping screw 41 until disk may be lifted clear of lug 43, the orifice disk may be rotated to bring any chosen orifice into registration with passageway 38. The clamping screw 41 is then threaded downwardly to clamp the disk in selected position and in fluid-tight relation, through gasket 39, with the top of head 31, lug 43 engaging the corresponding notch 46 to insure that the disk may not be inadvertently rotated out of selected position. The chosen orifice 45 represents the "by-pass orifice", the office of which will be later made apparent, as will also the purpose of providing for a selection of orifices.

The bottom wall 47 of body portion 21 has a central opening 48 which is normally adapted to be closed by the relief or auxiliary valve generally indicated at 49. This valve embodies a circular head 50 having a down turned annular flange 51 normally adapted to seat in fluid-tight engagement on replaceable seat-ring 52, of rubber or the like, which ring is confined in groove 53 located concentrically with respect to opening 48. Head 50 has a conical extension 54 which takes and centers the lower end of compression spring 55, the upper end of this spring being centered by the depending boss 56 on head 31. The spring has a constant tendency to urge valve 49 to closed position.

Depending from head 50 is a stem or extension 57 which extends with annular clearance through orifice 48, this annular clearance representing the effective full-open area of the relief valve when head 50 is lifted or tilted from its position of Fig. 1. While the relief valve may be of any type suitable for the purpose, and my broader claims contemplate such a consideration, the utilization of a tilt valve for this purpose is particularly feasible, and therefore is the type of valve illustrated.

Stem 57 extends downwardly through bore 20 of flange 16 and the effective length thereof is a controlling factor in the timing of the valve, as will appear. While it lies within the scope of the invention merely to cut the stem to an effective length which will give a permanent predetermined timing to the valve (as far as relief-valve movement is concerned), as a matter of convenience I may render the stem longitudinally adjustable so the valve timing may be varied to suit different conditions. In the illustrated embodiment of the invention this is accomplished by making the stem longitudinally telescopic, with a threaded joint between the stem sections. The upper section 58 has a threaded portion 59 of reduced diameter, upon which may be slipped a desired number of shims 60. The lower section 61 of the stem has a central, threaded bore 62 adapted to take threaded extremity 59. By varying the number of shims and then screwing section 61 upwardly to a position of tight engagement with the lowermost shim, the effective length of stem 57 may be varied.

The lower end of section 61 tapers downwardly at 63 and terminates in a tip 64 of materially reduced diameter.

I utilize a retainer in connection with the relief valve stem, and while any suitable type of catch may be employed for this purpose, irrespective of its individual nature and place of attachment, I have illustrated a retainer or spring-clip which has been found to function particularly well. The retainer is generally indicated at 65, being made of a non-corrosive spring material and comprising an arcuate body portion 66 which is sprung into the groove 67 cut in body member 10 at a point below discharge pipe 16. The two arms or ends of the retaining member are struck back convergently at 68 and 69 to form a fork and defining a convergent guide-passageway or mouth 70a leading to restricted throat 70, smaller than the major outside diameter of stem 57, the retainer being positioned so stem 57 lies opposite mouth 70. The tips 71 and 72 of the retainer are struck reversely to form a diverging confinement and guide channel 73, for a purpose to be later set forth.

The tilt-valve actuator generally indicated at 74 includes a plunger or thrust rod 75 having sliding fit through bore 76 which is located to bring the end of the thrust rod directly in line with stem 57.

The outer end of rod 75 carries a head 77 which is confined for horizontal sliding movement through the bore of bonnet nut 78 threaded to body member 10 at 79. The end of nut 78 is turned over as at 78a to confine the flange 80 of actuating handle 81. Packing 82 is utilized to pack-off rod 75 where it passes through bore 76, a follower or gland 83 being positioned on the stem as illustrated. A compression spring 84 encircles rod 75 and bears at its opposite ends against head 77 and follower 83. This spring has the three-fold function of (1) maintaining follower 83 in pressural engagement with packing 82 to constantly compress the latter about the rod, (2) yieldingly maintaining rod 75 in inoperative position (and, of course, returning it to inoperative position after it has been manually thrust into operative position and then released) and, (3) through the engagement of rod head 77 with the end of handle 81, yieldingly maintaining handle 81 in "at rest" position. The mounting of handle 81 in nut 78 may be considered as one allowing universal movement of the handle to operative position. In other words, the handle 81 may be rocked in any direction (such as downwardly to the position of Fig. 2) which results in rod 75 being thrust to the right, swinging the tilt-valve to open position, as illustrated in that figure.

With valve 49 thus open there is established communication from chamber B through by-pass orifice 45, chamber H and orifice 48 to the bore 20 of discharge pipe 16 and thence to outlet 14. This course will be termed the "control passageway" and is indicated in Fig. 2 by the line C. As mentioned at the forepart of the specification, the broader aspects of the invention do not demand that this control passageway be located in the movable, main valve assembly V, nor does it necessarily include a chamber such as H. However, as a matter of convenience and efficiency the particular nature of the control passageway along the lines of that illustrated is of decided advantage. Likewise, the utilization of chamber H both as a part of the control passageway and a convenient receptacle for the relief valve and its spring is of decided advantage, though not controlling on the broader aspects of the invention.

The upper end of cylinder 35 is closed by cap 86, having a wrench-taking head 87. Preferably a gasket 88 is provided to insure the fluid-tight fit of this cap. It will be seen that by removing cap 86, the entire piston and valve assembly V may be bodily removed from or inserted in the cylinder, and that likewise this cap provides for easy access to the clamping screw 41 and orifice disk 40 for adjustment or cleaning. The convenience and utility of these features will be self-evident.

As the feature of special advantage, all elements through which restricted orifices extend (disk 40, body portion 21, head 31, and sleeve 23) are preferably made of non-metallic, non-magnetic and non-corrosive material, such as bakelite. Thus are avoided the corrosive effects, especially where the flushing water is relatively high in alkali content, which would tend to alter the effective openings of such orifices were they provided through metallic elements. Furthermore, there are no metal-to-metal contacts between the working parts of assembly V, electrolytic action therebetween, with its corrosive effects, thus being avoided.

It will be also noted that the elements of assembly V are very simply interconnected by large-diameter, screw-threaded joints, which not only contribute to rapid and easy assembly operations, but also avoid the use of small screws, pins and the like which are always a source of trouble in a mechanism of this character.

Should foreign matter be carried into orifice 45 from the fluid supply line and, for some unaccountable reason lodge in said orifice in spite of the alternate flow of fluid in opposite directions therethrough, the orifice may be easily cleaned by removing cap 82 and merely running a wire downwardly through the orifice. While most flush valves do not have a means for regulating the by-pass orifice, those that are provided with such an adjustment usually depend upon needle valves, which are particularly prone to become clogged and are particularly difficult to clean. As distinguished from that situation it will be seen that the selected orifice in disk 40 is entirely unobstructed by adjusting mechanism, and therefore that in any position of adjustment to which the disk may be put, the effective orifice is fully open and accessible throughout its extent.

In describing the operation of the valve, it will first be assumed that it is in the condition of Figure 1, fluid under supply-pressure standing in chambers A, B and H, the fluid in chamber B having been admitted through orifice 37, chamber H and orifice 45. However, since the upwardly exposed, effective pressure area of the piston is greater than the downwardly exposed effective pressure area, the assembly V is held down to effect a barrier in passageway M between inlet 12 and outlet 14.

When handle 81 is rocked (for instance, as in

Fig. 2) thrust rod 75 is moved to the right in that figure, its end engaging stem 57 and thus tilting relief or auxiliary valve 49 to the position of Fig. 2. This movement of stem 57 spreads retainer arms 68 and 69 to pass the stem through throat 70 into the dotted line position of Fig. 5, the retainer arms then springing back to hold said stem releasably in its position of angularity with respect to the vertical axis of the main valve and thus releasably maintaining the relief valve in tilted or open condition. Retention of the relief valve in open position is thus accomplished automatically upon the actuation of handle 81, although the actuation of the handle may be only for an instant, so immediately thereafter said handle may be released, whereupon spring 84 returns rod 75 and handle 81 to the position of Fig. 1, though the relief valve is still held open.

With relief valve 49 thus open, the pressure in cylinder chamber B is relieved, fluid therefrom passing downwardly through orifice 45, chamber H, orifice 48, bore 20 and thence outwardly through discharge opening 14 to the toilet fixture. At the same time, fluid under pressure from inlet 12 enters chamber H through orifice 37, setting up a back pressure in said chamber, which slows down the rate of relief from cylinder chamber B, the significance of which will later be made apparent. The following proportionate sizes of orifices, and as indicated in the drawings, has been found to give satisfactory results: the effective opening of orifice 37 somewhat greater than that of orifice 45, and the effective opening of orifice 48 somewhat greater than that of orifice 37.

As the pressure in chamber B is thus relieved, the consequent predominant pressure in chamber A moves assembly V upwardly, the relative sizes of the orifices being such as to give a predetermined relatively slow rate of ascension. As assembly V moves upwardly toward the position of Fig. 4, the main fluid passageway M is opened, fluid from inlet 12 passing under the lower end of sleeve 23, thence upwardly through passageways 28, and then over end 19 of discharge pipe 16, and downwardly through bore 20 to discharge outlet 14, whence it passes to the toilet fixture. However, during the initial opening movement of the valve, passage of fluid through channels 28 is relatively retarded due to restrictions 29, the initial discharge of water being thus restricted to a relatively small flow, but progressively increasing as the main valve rises. This initially slow and gradually increasing rate of discharge avoids the "gulping" noises and splashing common to valves which open suddenly to full-discharge position. While this is not controlling on the invention, in the illustrated embodiment of the invention, maximum flow is not had until sleeve 23 has moved upwardly about two-thirds of its full travel.

Now my invention broadly contemplates subsequent, automatic movement of the tilt-valve to closed position (to initiate closing movement of the main valve) by virtue of opening movement of the main valve. I have illustrated an arrangement whereby this is accomplished in a particular way and have drawn individual claims thereto, but it is to be understood this choice is not limitative on the invention.

Relief valve 49, in open condition, is carried upwardly with the main valve in its movement towards open position, stem 58 being drawn upwardly through but not laterally freed from retainer 65. The effective length of stem 57 is such that as the main valve reaches a predetermined position (assuring ample flushing-discharge) the major diameter portion of said stem is lifted clear of arms 71—72, whereupon stem 57 is free to swing back to normal position, closing relief valve 49. Spring 55 aids in this return. Stem tip 64 is of such a diameter that it may swing through retainer mouth 70 without interference, a function of the tip being to insure that the stem does not by any possibility swing transversely out of line with the opening between the retainer arms and subsequently "hang-up" on the retainer.

It will also be evident that varying the length of stem 57, either through the selective use of one-piece valve stems of different lengths or by the screw-thread and shim adjustment illustrated, is effective to vary the time at which the relief valve is automatically released and hence to vary the extent to which the main valve opens.

With the return of the relief valve to closed position, flow through control passageway C is again interrupted, and supply line pressure admitted to chamber H through orifice 37 restores the pressure in chamber B through by-pass orifice 45. The pressures in chambers A, B and H finally become equalized, but due to the greater effective area exposed to the pressure in chamber B, the valve assembly V is moved downwardly toward closing position. As the main valve approaches its lowermost or closing position, the amount of discharge is gradually diminished due to restrictions 29 in the passageways 28, the volume of water admitted through restrictions 29 being insufficient to continue the siphoning of the toilet fixture and therefore permitting the water flowing after such cessation of siphoning to act as an "afterflow" to provide an adequate refill of the toilet bowl.

As the main valve reaches closed position, the seals at 19 and 27 simultaneously come into play, each seal reducing the pressure of the water flow therethrough, backing up the water between seals to reduce the velocity of flow and thus modifying the "wire-drawing" noises incident to the final closing movement of usual valves.

Now due to the provision for automatically retaining the relief valve in open position and the consequent ability to give the sought-for slow but full opening movement to the main valve, it is assured that an ample flushing discharge may be had, and that a considerable portion of this discharge may occur during the opening movement of the main valve. Consequently, the closing movement of the main valve may be relatively rapid, to the advantageous ends pointed out above. This results in the ability to make by-pass orifice 45 of relatively large size, as distinguished from the relatively small by-pass orifices used in valves where the closing movement of the main valve must be very slow in order to insure an adequate discharge. In fact, I find it possible to make this by-pass orifice of four or five times the area of usual by-passes, and have accordingly as greatly diminished the liability of by-pass cloggage.

However, since orifice 45 is effective in controlling the rate of relieving the pressure from chamber B in order to control the rate of main valve opening, as well as controlling the rate at which the pressure is rebuilt in that chamber to control the closing movement of the valve, and since it is usually desirable that the rate of opening be slower than the rate of closing, orifice 45 is given differential effectiveness in these two phases of operation. It is in this connection that the admission of line pressure through orifice 37 during the ascension of the valve, comes into play.

This situation may be set forth as follows (assuming that the supply-line pressure remains constant). The rate of ascension or opening movement of the main valve is in accordance with the relief of pressure in chamber B, and this relief occurs in accordance with the lowering of pressure in chamber H. Hence the rate of opening movement depends in part upon the sizes of orifices 45 and 48. However, since full line pressure stands constantly at orifice 37 and hence is constantly tending to build up pressure in chamber H to compensate partially for the pressure-drop occasioned through the opening of orifice 48, the pressure-drop in chamber H is retarded to an extent which diminishes the relief of pressure from above the valve assembly and hence slows down the rate of main valve opening. It will be seen that the back-pressure created in chamber H depends in part upon the fact that supply-line pressure is admitted at 37 to control passage C at a point intermediate the relief valve orifice 48 and by-pass orifice 45. Of course, relief orifice 48 is sufficiently large to insure an ultimate relief of pressure in chamber B at the desired rate, in spite of the inflow through orifice 37, but it is at the same time sufficiently restricted to insure such building up of back pressure in chamber H as to accomplish the above ends.

Thus, orifices 48 and 37 taken together are factors in controlling the rate of valve assembly opening, and reduce the effectiveness of orifice 45 to relieve pressure from chamber B as compared with the effectiveness of said orifice to pass fluid back into that chamber B for rebuilding the pressure utilized in closing the main valve. So we have a situation where orifice 45 may be sufficiently large to give a relatively rapid valve-closing movement and yet said relatively large orifice is effective only as a smaller orifice when it plays its part in controlling the valve opening movement. And this differential effectiveness of the orifice is accomplished solely by fluid pressure means which, rather than calling for the imposition of adjusting means in connection with the orifice with a consequent liability of stoppage, actually tends to maintain the orifice clear of any obstruction, for it will be seen that fluid flows in one direction through this orifice during one phase of operation, and in the opposite direction during another phase of operation, this alternate flow having a flushing and cleansing effect.

To recapitulate, the rate of valve opening movement is dependent upon the relative sizes of orifices 48, 45 and 37 while the rate of valve closing is dependent only upon the relative sizes of orifices 37 and 45, and all these relative sizes are such that the valve opening movement is relatively slow and the valve closing movement is relatively fast.

Of course, the relatively restricted orifice 48 would act to retard flow from chamber B in a manner to decrease the relief effectiveness of orifice 45 even if orifice 37 did not open into the control passage, but the illustrated association of orifices gives particularly good results.

While the length of stem 57 may be varied to adjust the timing of the valve even though the supply line pressure and the size of the by-pass orifice be unchanged, it is found that various service-pressure conditions sometimes call for an orifice adjustment. In other words, the supply line pressure is a factor in determining the rate of pressure relief and pressure build-up in chamber B and hence is a factor in the rate at which the main valve opens and closes, and accordingly as this pressure is relatively high or relatively low the by-pass opening must be relatively small and relatively large, respectively, in order to insure that the valve opens and closes at such a rate as will insure an adequate and substantially uniform volume of flushing discharge, it being realized that the amount of discharge should be substantially uniform irrespective of the supply line pressure. It is to meet this situation that I have provided the adjustable orifice disk 40, with all its individual features of advantage spoken of above.

In Figures 9, 10 and 11 I have illustrated a variational form of valve sleeve, Figure 10 showing the main valve as closed and Fig. 11 showing it open. The flushometer structure, outside of this sleeve, is precisely that described before, and therefore the parts will be given the same reference numerals except that they will be primed.

Sleeve 23' is guided on discharge pipe 16' and has sealing seat at 27' and 19', just as described in connection with sleeve 23. However, the fluid passageways 28', instead of being cut merely as channels in a wall of the sleeve and extending upwardly from the lower end thereof, are cut straight through the wall of the sleeve, it following that when the valve is open the fluid is free to pass directly through the sleeve instead of beneath its lower end. However, passageways 28' have upper restricted portions 29', which correspond to restrictions 29 in function. Further, the side defining walls 29'' which lead from the major width of a given passageway to its restriction 29', are convergent. It will thus be seen that when sleeve 23', starts its upward movement, only a limited flow of water is allowed through restrictions 29', and that this flow is gradually increased to full flow as sleeve 23 rises, having the same advantageous effects described in connection with the preferred embodiment. Likewise, during the closing movement of the main valve, the discharge flow through passageways 28' is cut down due to restrictions 29' as the valve approaches closed position, thus giving the after-flow effect mentioned in connection with the preferred embodiment.

While I have shown and described preferred embodiments of my invention it will be understood that the various changes in design, structure and arrangement may be made without departing from the spirit and scope of the appended claims.

I claim:

1. In a flushometer, a body member having inlet and outlet openings and a main fluid passageway from inlet to outlet, a main valve movable to and from passageway-closing position at a point intermediate the inlet and outlet and normally held in closing position, a cylinder, a piston in the cylinder and connected to the valve in a manner whereby piston reciprocation moves the valve as above, there being an orifice through one of the walls defining a given cylinder chamber at one side of the piston, the cylinder chamber at the other side of the piston being in communication with said passageway at the inlet side of the valve, there being a control passageway from said orifice and discharging at the outlet side of the main valve, there being an orifice and a valve therefor for controlling the discharge from the control passageway, manually actuated means for opening said orifice valve, and there being a third orifice allowing communication between said main passageway at the inlet side of the main valve and the control passageway at a point intermediate the first mentioned and valved orifices, the sizes of the first mentioned and third orifices being factors in determining the rate of fluid flow into said given cylinder chamber when said valved orifice is closed, such fluid flow pressing the piston in a direction to close the main valve, and the sizes of all said orifices being factors in determining the rate of fluid-discharge from said given cylinder chamber through the control passageway when said valved orifice is open, the relative sizes of said orifices being such as to create back-pressure between the open valved orifice and the first mentioned orifice, by reason of the fluid-flow from said main passageway through said third orifice into the control passageway, of a magnitude to reduce the rate of fluid-flow, from the given cylinder chamber through the first mentioned orifice into the control passageway, below the full discharge capacity of said first-mentioned orifice; the restricted fluid-discharge from the given cylinder chamber allowing the consequently predominant pressure in the other cylinder chamber to move the piston in a direction to open the main valve; and means associated with the orifice-valve to delay its closure for a predetermined period after it has been manually opened.

2. In a flushometer, a body member having inlet and outlet openings and a main fluid passageway from inlet to outlet, and a valve for said passageway, said valve embodying an upright annular flange in the passageway and with its opposite ends adapted to be in communication with the inlet and outlet sides of the passageway, and an inverted-cup stopper having its skirt-portion encircling the flange, said stopper being vertically reciprocable over the flange and adapted to close off the flange bore when the stopper is in its lowermost position, there being vertically extending fluid-passageways formed in the skirt-portion of the stopper, said passageways leading from the bore of the skirt portion to the exterior thereof and effective to pass fluid from the inlet side of the main passageway to the bore of the flange when the stopper is raised from its lowermost position, said passageways in the skirt portion being diminished in effective size at the upper ends thereof.

3. In a flushometer, a body member having inlet and outlet openings and a main fluid passageway from inlet to outlet, a main valve movable to and from passageway-closing position at a point intermediate the inlet and outlet and normally held in closing position, fluid being freed for passage from inlet through outlet when the main valve is initially opened, and fluid pressure operated means for opening and closing the main valve and including a vertical cylinder, a piston in the cylinder and connected to the valve in a manner whereby piston reciprocation moves the valve as above, the cylinder chambers at opposite sides of the piston being normally in communication with said passageway at the inlet side of the valve, there being a control passageway from a relatively restricted orifice opening to the cylinder chamber above the piston and discharging through a second orifice at the outlet side of the main valve, a normally-closed auxiliary valve for opening and closing said second orifice, the communication between the inlet side of the main fluid passageway and said upper chamber being by way of a third orifice opening from said inlet side to said control passageway at a point between said restricted orifice and the auxiliary valve, the third orifice being of greater effective opening than the restricted orifice, and the second orifice being of greater effective opening than the third orifice; and means for operating said auxiliary valve, and including means holding the auxiliary valve open during the time of initial flow from inlet through outlet as allowed by virtue of initial opening of the main valve, said auxiliary valve being released from the holding means by virtue of opening movement of the main valve to a predetermined position.

4. In a flushometer, a body member having a fluid passageway, a vertically movable main valve for the passageway, fluid-pressure-operated means for opening and closing said valve, an auxiliary tilt valve carried by and movable with the main valve and having a stem, said tilt valve being adapted to be opened and closed by tilting movement for controlling the application of fluid pressure to said means, manually actuated means for tilting the valve to open it, said stem being moved laterally in one direction and in a given axial plane when the valve is so tilted, and a retainer adapted to delay subsequent closing movement of the tilt valve for a predetermined period, said retainer embodying members defining a throat which is restricted with relation to the diameter of the stem, said throat being in said axial plane and in the path of lateral movement of the stem, one, at least, of said defining members being resiliently movable and being adapted to yield and thereby allow the stem to pass through said throat to a position behind the retainer when the stem is moved laterally in said one direction and then to return to restricting position, the stem being thereafter free for vertical movement and being lifted from behind said retainer upon subsequent upward vertical movement of the main valve.

5. In a flushometer, a body member having a fluid passageway, a vertically movable main valve for the passageway, fluid-pressure-operated means for opening and closing said valve, an auxiliary tilt valve carried by and movable with the main valve and having a stem, said tilt valve being adapted to be opened and closed by tilting movement for controlling the application of fluid pressure to said means, manually actuated means for tilting the valve to open it, said stem being moved laterally in one direction and in a given axial plane when the valve is so tilted, and a retainer adapted to delay subsequent closing movement of the tilt valve for a predetermined period, said retainer embodying members defining a throat which is restricted with relation to the diameter of the stem, said throat being in said axial plane and in the path of lateral movement of the stem, one, at least, of said defining members being resiliently movable and being adapted to yield and thereby allow the stem to pass through said throat to a position behind the retainer when the stem is moved laterally in said one direction and then to return to restricting position, the stem being thereafter free for vertical movement and being lifted from behind said retainer upon subsequent upward vertical movement of the main valve, the free end of said stem tapering downward to a tip of a diameter smaller than the width of the throat and adapted to pass back through the throat when the stem is so lifted a predetermined extent.

6. In a flushometer, a body member having a fluid passageway, a main valve for the passageway, fluid-pressure-operated means for opening and closing said valve, an auxiliary tilt valve having a stem, said tilt valve being adapted to be opened and closed by tilting movement for controlling the application of fluid pressure to said means, manually actuated means for tilting the valve to open it, said stem being moved laterally in one direction when the valve is so tilted, and a retainer adapted t delay subsequent closing movement of the tilt valve for a predetermined period, said retainer embodying a resilient clip having an arcuate portion sprung into a groove in the wall of the body member, and radial arms at the ends of the arcuate portion, said arms converging inwardly and being disposed in the path of lateral movement of said stem.

7. In a flushometer, a body member having a fluid passageway, a main valve for the passageway, fluid-pressure-operated means for opening and closing said valve, an auxiliary tilt valve having a stem, said tilt valve being adapted to be opened and closed by tilting movement for controlling the application of fluid pressure to said means, manually actuated means for tilting the valve to open it, said stem being moved laterally in one direction when the valve is so tilted, and a retainer adapted to delay subsequent closing movement of the tilt valve for a predetermined period, said retainer embodying a resilient clip having an arcuate portion sprung into a groove in the wall of the body member, and radial arms at the ends of the arcuate portion, said arms converging inwardly to define a guiding mouth leading toward a restricted throat, said mouth being disposed in the path of lateral movement of said stem, said arms diverging at the opposite side of said throat.

8. In a flushometer, a substantially cylindrical body having a fluid-passageway, a main valve for the passageway, fluid-pressure operated means for vertically reciprocating the valve to open and close it, an auxiliary tilt valve carried by the main valve in its reciprocation and adapted to be tilted open and closed for controlling the application of pressure to said means, said tilt valve having a depending member, manually actuated means for tilting the auxiliary valve open and thereby swinging said member directly in a radial plane of the body, and a retainer associated with the tilt valve and adapted to delay its closure for a predetermined period and then unrestrainedly permit its closure, said retainer embodying a latch on the body and movable transversely of the body axis to latchingly engage the depending member when it is so swung, said depending member being subsequently movable vertically clear of the latch member without transverse movement of the latch member and without the latch member offering restraint to such vertical movement when the main valve lifts the tilt valve a predetermined distance.

9. In a flushometer, a substantially cylindrical body member having a fluid-passageway, a main valve for the passageway, fluid-pressure operated means for vertically reciprocating the valve to open and close it, an auxiliary tilt valve carried by the main valve in its reciprocation and adapted to be tilted open and closed for controlling the application of pressure to said means, said tilt valve having a depending member, manually actuated means for tilting the auxiliary valve open and thereby swinging said member directly in a radial plane of the body member, and a retainer associated with the tilt valve and adapted to delay its closure for a predetermined period and then unrestrainedly permit its closure, said retainer embodying a latch on one of the members and movable transversely of the body axis to latchingly engage a portion of the other member when said depending member is so swung, said portion and latch being subsequently relatively vertically movable clear of one another, without transverse movement of the latch and without the retaining member offering restraint to such vertical movement when the main valve lifts the tilt valve a predetermined distance.

10. In a flushometer, a body member having inlet and outlet openings and a main fluid passageway from inlet to outlet, a main valve movable to and from passageway-closing position at a point intermediate the inlet and outlet and normally held in closing position, a vertically arranged cylinder, a piston in the cylinder and having a hollow, said piston being connected to the valve in a manner whereby piston reciprocation moves the valve as above, there being an orifice opening from the piston hollow to the cylinder chamber above the piston, the cylinder chamber below the piston being in communication with said passageway at the inlet side of the valve, a discharge orifice opening from the piston hollow to the outlet side of the main valve, a valve for controlling the discharge from the piston hollow through the discharge orifice, manually actuated means for opening the discharge valve, and there being a third orifice opening through the side of the piston from the main passageway at the inlet side of the main valve to the piston hollow at a point intermediate the first mentioned and discharge orifice, the sizes of the first and third mentioned orifices being factors in determining the rate of fluid flow into the cylinder chamber above the piston when the valve for the discharge orifice is closed, such fluid flow pressing the piston in a direction to close the main valve, and the sizes of all said orifices being factors in determining the rate of fluid-discharge from the cylinder chamber above the piston through the piston hollow and the first and discharge orifices when the valve for the discharge orifice is open, the relative sizes of said orifices being such as to create back-pressure between the open discharge orifice and the first mentioned orifice, by reason of the fluid flow from said main passageway through said third orifice into the piston hollow, of a magnitude to reduce the rate of fluid flow from the upper cylinder chamber through the first mentioned orifice into the piston hollow, below the full-discharge capacity of said first mentioned orifice; the restricted fluid-discharge from the upper cylinder chamber allowing the consequently predominant pressure in the lower cylinder chamber to move the piston in a direction to open the main valve; and means associated with the discharge-orifice-valve to delay its closure for a predetermined period after it has been manually opened.

11. In a flushometer, a body member having inlet and outlet openings and a main fluid passageway from inlet to outlet, a main valve movable to and from passageway-closing position at a point intermediate the inlet and outlet and normally held in closing position, a cylinder, a piston in the cylinder and connected to the valve in a manner whereby piston reciprocation moves the valve as above, there being an orifice through one of the walls defining a given cylinder chamber at one side of the piston, the cylinder chamber at the other side of the piston being in communication with said passageway at the inlet side of the valve, there being a control passageway from said orifice and discharging at the outlet side of the main valve, there being an orifice and a valve therefore for controlling the discharge from the control passageway, manually actuated means for opening said orifice valve, and there being a third orifice allowing communication between said main passageway at the inlet side of the main valve and the control passageway at a point intermediate the first mentioned and valved orifices, the third mentioned orifice being of greater effective opening than the first mentioned orifice and the second mentioned orifice being of greater effective opening than the third mentioned orifice, the sizes of the first mentioned and third orifices being factors in determining the rate of fluid flow into said given cylinder chamber when said valved orifice is closed, such fluid flow pressing the piston in a direction to close the main valve, and the sizes of all said orifices being factors in determining the rate of fluid-discharge from said given cylinder chamber through the control passageway when said valved orifice is open, the relative sizes of said orifices being such as to create back-pressure between the open valved orifice and the first mentioned orifice, by reason of the fluid-flow from said main passageway through said third orifice into the control passageway, of a magnitude to reduce the rate of fluid-flow, from the given cylinder chamber through the first mentioned orifice into the control passageway, below the full discharge capacity of said first-mentioned orifice; the restricted fluid-discharge from the given cylinder chamber allowing the consequently predominant pressure in the other cylinder chamber to move the piston in a direction to open the main valve; and means associated with the orifice-valve to delay its closure for a predetermined period after it has been manually opened.

12. In a flushometer, a body member having inlet and outlet openings and a main fluid passageway from inlet to outlet, a main valve movable to and from passageway-closing position at a point intermediate the inlet and outlet and normally held in closing position, a vertically arranged cylinder, a piston in the cylinder and having a hollow, said piston being connected to the valve in a manner whereby piston reciprocation moves the valve as above, there being an orifice opening from the piston hollow to the cylinder chamber above the piston, the cylinder chamber below the piston being in communication with said passageway at the inlet side of the valve, a discharge orifice opening from the piston hollow to the outlet side of the main valve, a valve for controlling the discharge from the piston hollow through the discharge orifice, manually actuated means for opening the discharge valve, and there being a third orifice opening through the side of the piston from the main passageway at the inlet side of the main valve to the piston hollow at a point intermediate the first mentioned and discharge orifice, the third mentioned orifice being of greater effective opening than the first mentioned orifice and the second mentioned orifice being of greater effective opening than the third mentioned orifice, the sizes of the first and third mentioned orifices being factors in determining the rate of fluid flow into the cylinder chamber above the piston when the valve for the discharge orifice is closed, such fluid flow pressing the piston in a direction to close the main valve, and the sizes of all said orifices being factors in determining the rate of fluid-discharge from the cylinder chamber above the piston hollow and the first and discharge orifices when the valve for the discharge orifice is open, the relative sizes of said orifices being such as to create back-pressure between the open discharge orifice and first mentioned orifice, by reason of the fluid flow from said main passageway through said third orifice into the piston hollow, of a magnitude to reduce the rate of fluid flow from the upper cylinder chamber through the first mentioned orifice into the piston hollow, below the full-discharge capacity of said first mentioned orifice; the restricted fluid-discharge from the upper cylinder chamber allowing the consequently predominant pressure in the lower cylinder chamber to move the piston in a direction to open the main valve; and means associated with the discharge-orifice-valve to delay its closure for a predetermined period after it has been manually opened.

13. In a flushometer, a body member having inlet and outlet openings and a main fluid passageway from inlet to outlet, a main valve movable vertically to and from passageway-closing position at a point intermediate the inlet and outlet and normally held in closing position, fluid being freed for passage from inlet through outlet when the main valve is initially opened, and fluid pressure operated means for opening and closing the main valve and including a vertical cylinder, a piston in the cylinder and connected to the valve in a manner whereby piston reciprocation moves the valve as above, the cylinder chambers at opposite sides of the piston being normally in communication with said passageway at the inlet side of the valve, there being a control passageway from a relatively restricted orifice opening to the cylinder chamber above the piston and discharging through a second orifice at the outlet side of the main valve, an auxiliary tilt valve carried by and movable with the main valve and having a depending stem, said tilt valve normally closing said second orifice and being adapted to be tilted out of orifice-closing position; the communication between the inlet side of the main fluid passageway and said upper chamber being by way of a third orifice opening from said inlet side to said control passageway at a point between said restricted orifice and the auxiliary valve, the third orifice being of greater effective opening than the restricted orifice, and the second orifice being of greater effective opening than the third orifice; manually actuated means for tilting the auxiliary valve open and thereby swinging said member directly in a radial plane of the body, and a retainer associated with the tilt valve and adapted to delay its closure for a predetermined period and then unrestrainedly permit its closure, said retainer embodying a latch on the body and movable transversely of the body axis to latchingly engage the depending member when it is so swung, said depending member being subsequently movable vertically clear of that latch member without transverse movement of the latch member and without the latch member offering restraint to such vertical movement when the main valve lifts the tilt valve a predetermined distance.

ELIHU C. WILSON.